United States Patent [19]

Imani

[11] 4,445,585
[45] May 1, 1984

[54] MOTORCYCLE CONFIGURATION

[75] Inventor: Yuichi Imani, Hamamatsu, Japan

[73] Assignee: Yamaha Hatsudoki Kabushiki Kaisha, Iwata, Japan

[21] Appl. No.: 423,027

[22] Filed: Sep. 24, 1982

[51] Int. Cl.³ .............................................. B62D 25/00
[52] U.S. Cl. .................................. 180/68.5; 180/219; 180/227
[58] Field of Search ...................... 180/68.5, 219, 220, 180/227

[56] References Cited

U.S. PATENT DOCUMENTS 2,109,316  2/1938  Harley .................................. 180/219
4,077,485  3/1978  Bonora et al. ...................... 180/68.5

FOREIGN PATENT DOCUMENTS 467213    6/1914   France ................................. 180/219
582287   12/1924   France ................................. 180/219
2306122  10/1976   France ................................. 180/227
2346174  10/1977   France ................................. 180/227

Primary Examiner—Joseph F. Peters, Jr.
Assistant Examiner—Kenneth R. Rice
Attorney, Agent, or Firm—Donald D. Mon

[57] ABSTRACT

A motorcycle has an engine with a crankcase supported on a body frame. The body frame has a pair of rear arm members. A battery is supported on the body frame between the rear arm members in the vicinity of the back of the crankcase, thereby being disposed in a convenient and compact lower region, and leaving an enlarged upper region available for articles such as an air cleaner, whose size should not unnecessarily be limited.

6 Claims, 3 Drawing Figures

MOTORCYCLE CONFIGURATION

FIELD OF THE INVENTION

The present invention relates to a motorcycle having an improved battery mounting position.

BACKGROUND OF THE INVENTION

In order to improve performance of an engine and/or reduce intake noises, enlargement of the capacity of the air cleaner is desired. In a conventional motorcycle, the battery is disposed along with the air cleaner in an inverted triangular space between members of the body frame below the seat. This construction makes it impossible to enlarge the capacity of the air cleaner, causing a deficiency in engine performance, which is impossible to improve and making it difficult to reduce engine intake noises. This is particularly true with recent motorcycle designs in which the inverted triangular space includes a rear wheel shock absorber, causing further difficulties because the space allowed to mount the air cleaner is further restricted. A conventional motorcycle has an additional deficiency of a relatively high center of gravity caused by the large weight of the battery being disposed in the inverted triangular space.

BRIEF DESCRIPTION OF THE INVENTION

In order to eliminate the defects thus far described, it is an object of the present invention to provide a motorcycle in which the capacity of an air cleaner may be enlarged without degrading body design, thereby improving engine performance.

Another object is to reduce intake noises while, at the same time, lowering the center of gravity of the motorcycle.

The present invention will be described in detail in connection with the embodiment thereof shown in the accompanying drawings.

DETAILED DESCRIPTION OF THE INVENTION

Figure 1:
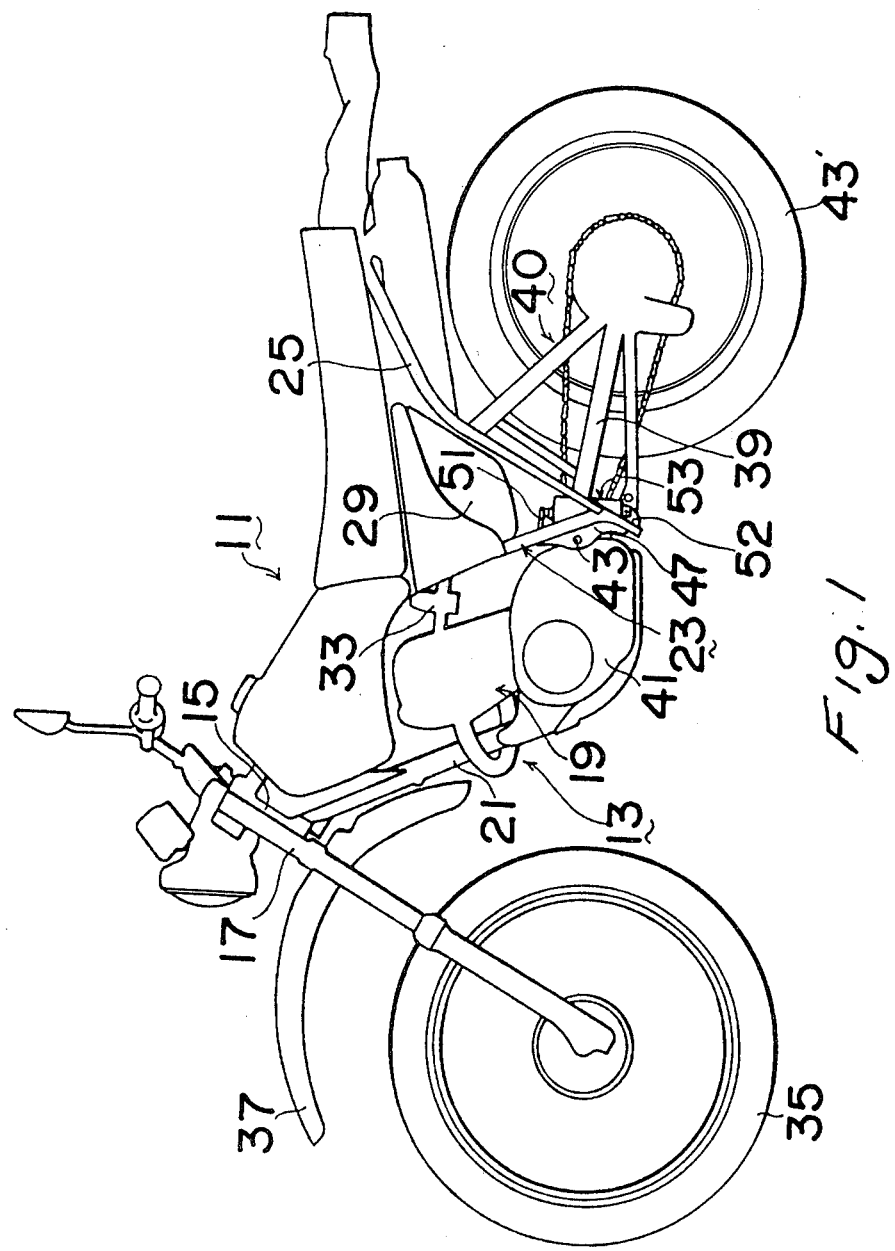
FIG. 1 is a side elevation of a motorcycle constructed according to the invention.
Figure 2:
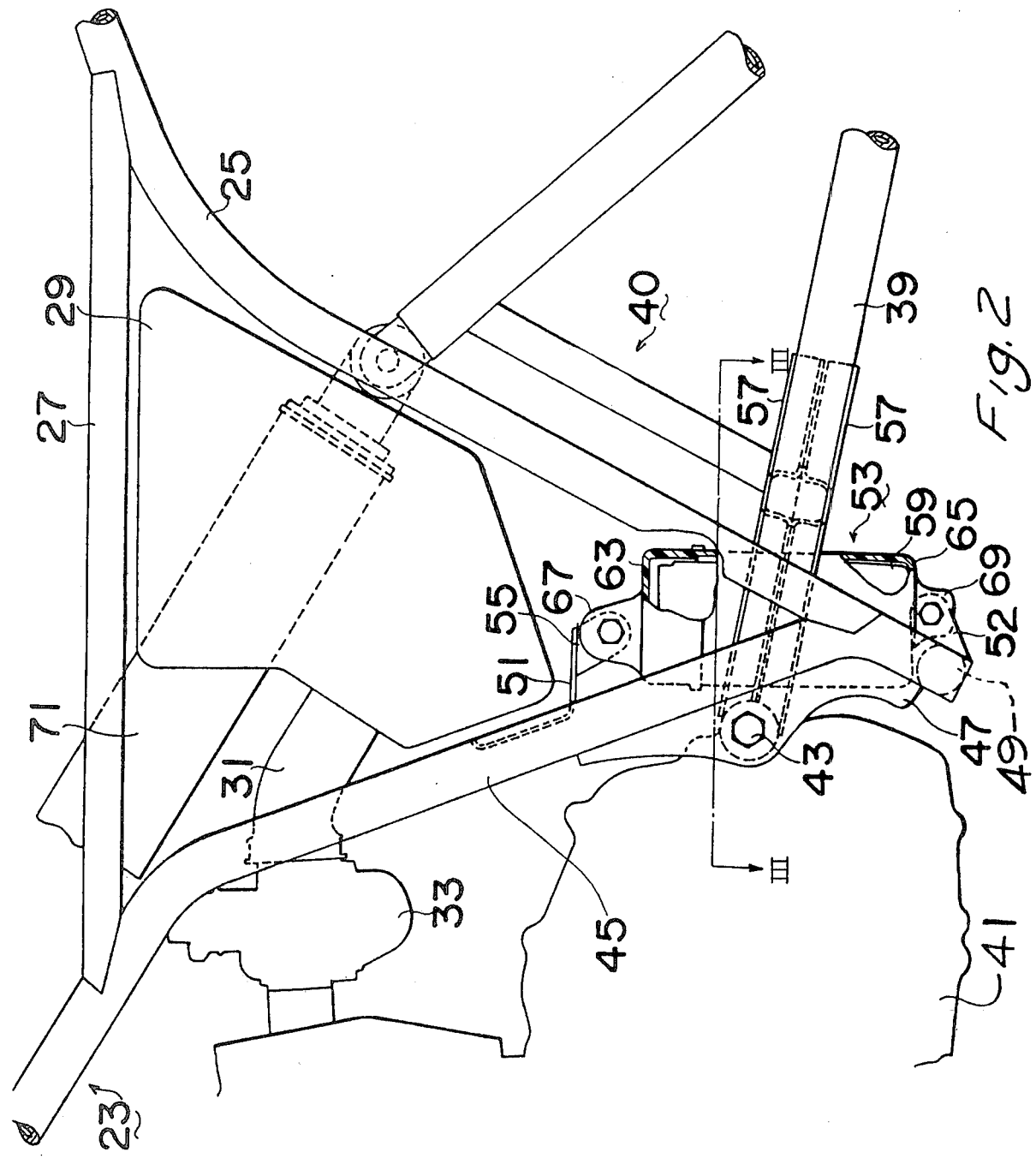
FIG. 2 is an enlarged view of a portion of the motorcycle constructed according to FIG. 1.
Figure 3:
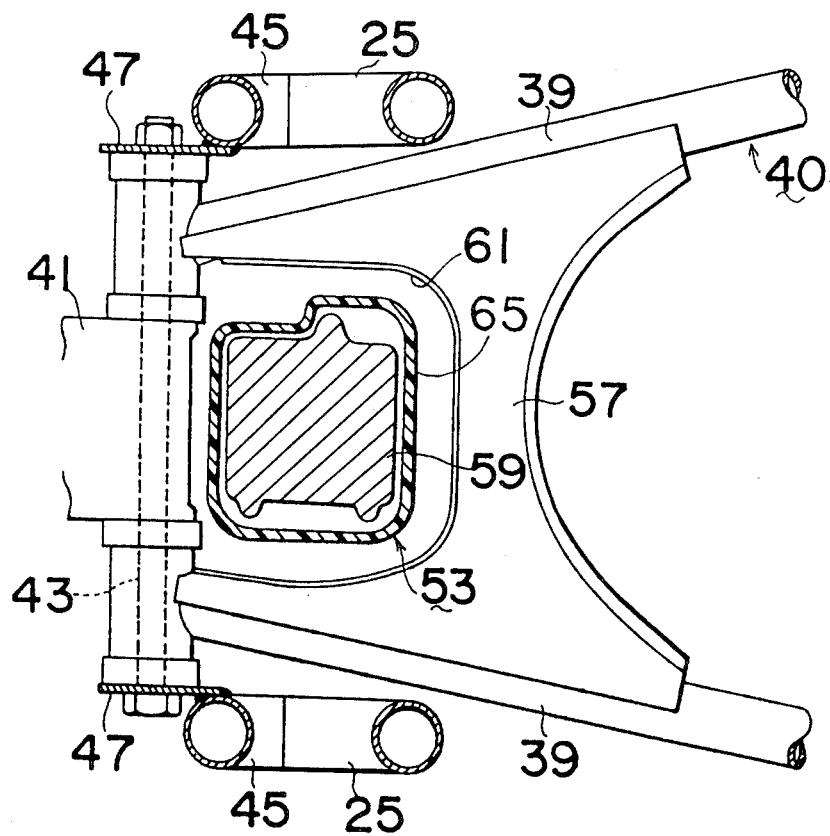
FIG. 3 is an enlarged detail sectional view taken at III—III of FIG. 2, illustrating a motorcycle constructed according to the invention.

As shown in the drawings, motorcycle 11 is equipped with body frame 13 and front fork 17 supported by steering column tube 15 at the front end of the body frame. Body frame 13 is composed of: a down tube 21 extending downward from the aforementioned steering column tube 15 supporting the front end of engine 19; a main pipe 23 extending backward from steering column tube 15 supporting the rear end of engine 19; a back stay 25 fixed to the rear end portion of main pipe 23 extending backward to the upper portion of the body; and a seat rail 27 arranged in the upper portion of the body to extend between main pipe 23 and back stay 25. Air cleaner 29 is positioned in the inverted triangular space defined by main pipe 23, back stay 25 and seat rail 27. Air cleaner 29, thus positioned, is connected through intake duct 31 to carburetor 33. Front fork 17 is equipped with a front wheel at its lower end and a fender 37.

Main pipe 23 is comprised of a pair of main pipe members 45, to which brackets 47 are respectively welded. A rear arm assembly 40 has rear arm members 39 hinged at their forward end to brackets 47 to swing on the shank of bolt 43. Bolt 43 also fastens brackets 47 to the rear portion of engine crankcase 41. Rear wheel 43[1] is hingedly supported on the rear portion of rear arm assembly 40. Main pipe members 45 are welded to cross member 49. Battery mounting upper bracket 51 having a plate-like shape, is interposed and welded between paired main pipe members 45 at its end edges. Battery mounting lower bracket 52 is welded to cross member 49. Fitting 55 is provided to fasten battery case 53 and is welded to battery mounting upper bracket 51. Gussets 57 are interposed and welded along their edges to rear arm members 39 to strengthen rear arm assembly 40. Gussets 57 have their front portions formed with U-shaped notches 61 providing clearance for arranging battery 59 therein.

Battery case 53, preferably of a synthetic resin, for mounting battery 59, is comprised of cover 63 and lower case body 65, having an integrally molded upper mounting member 67 and lower mounting member 69 respectively. Battery case 53 for supporting battery 59 is detachably secured to body frame 13 between rear arm members 39 to crankcase 41, loosely fitting in notches 61 of gussets 57. The battery case 53 is secured by fastening upper mounting member 67 to fitting 55 of battery mounting upper bracket 51 and fastening lower mounting member 69 to battery mounting lower bracket 52. Since battery 59 is mounted in body frame 13 inside battery case 53, it may easily be removed and replaced. It is protected against damage from rain and/or mud by being enclosed in case 53. Shock absorber 71 disposed in the inverted triangular space absorbs shocks to rear wheel 43 and is hinged at its rear end to upper end portion of rear arm assembly 40.

Battery 59 is installed by mounting it in battery case 53, pulling up battery case 53 from below body frame 13, fastening upper mounting member 67 of case 53 to the fitting of battery mounting upper bracket 51 and fastening lower mounting member 69 of case 53 to battery mounting lower bracket 52. Battery 59 is removed by reversing these operations.

As has been described, a motorcycle having an engine and crankcase supported on the body frame has a pair of rear arm members hinged to the body frame, and a battery supported on the body frame, the motorcycle being characterized by having the battery positioned adjacent to the crankcase between a pair of rear arm members. In other words, the battery is accommodated in a space left unused in prior art motorcycles, thus making it unnecessary to mount a battery in the inverted triangular space of the body frame. As a result, the air cleaner can be enlarged to increase its capacity without detracting from the design of the body so that performance of the engine is improved while reducing intake noises.

Moreover, since the large weight of the battery is disposed at a lower portion of the body frame, stability, steering, and handling characteristics are improved.

Furthermore, since the battery is surrounded at its front portion by the crankcase of the engine and at its right and left sides by rear arm members, it is protected against damage by objects thrown from a road surface during running operation of the motorcycle, even if the motorcycle is grounded, and also against damage if the motorcycle falls onto the ground.

This invention is not to be limited by the embodiment shown in the drawings and described in the description, which is given by way of example and not of limitation, but only in accordance with the scope of the appended claims.

I claim:

1. A motorcycle of the type in which an engine having a crankcase is supported on a body frame, a pair of rear arm members is hinged to said body frame, and in which a battery is supported on said body frame, the improvement comprising: said battery being disposed and mounted in the vicinity of the back of said crankcase between said pair of rear arm members.

2. In a motorcycle having an engine having a crankcase supported on a body frame, said engine being mounted in a space between members of the body frame beneath a seat, the improvement comprising: a rear arm assembly hingedly connected to said body frame and engine; said rear arm assembly having two spaced apart members extending outwardly and rearwardly forming a space therebetween at the rear of said engine adjacent a lower portion of said frame, and battery mounting means positioned in said space.

3. A motorcycle according to claim 2, in which said battery mounting means comprises: a pair of brackets attached to said body frame in said space; and in which said battery mounting means includes a battery enclosing case attached to said brackets.

4. A motorcycle according to claim 3, including a gusset which bridges said rear arm members to strengthen said rear arm assembly.

5. A motorcycle according to claim 2, in which said rear arm assembly comprises: a pair of brackets secured to said body frame on either side of said engine; said rear arm members each terminating in a forwardly attached tubular sleeve; and a bolt having its shank passing through said brackets, said tubular sleeves and the crankcase of said engine thereby hingedly securing said rear arm members to said engine.

6. A motorcycle according to claim 5, including a gusset which bridges said rear arm members to strengthen said rear arm assembly.

* * * * *